(12) United States Patent
Kim et al.

(10) Patent No.: US 12,556,380 B2
(45) Date of Patent: Feb. 17, 2026

(54) METHOD FOR ANALYZING QUANTUM VULNERABILITY AND SYSTEM THEREFOR

(71) Applicant: SAMSUNG SDS CO., LTD., Seoul (KR)

(72) Inventors: Eun Kyung Kim, Seoul (KR); Chang Hoon Lee, Seoul (KR); Hyo Jin Yoon, Seoul (KR); Ji Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 174 days.

(21) Appl. No.: 18/383,249

(22) Filed: Oct. 24, 2023

(65) Prior Publication Data
US 2024/0333484 A1   Oct. 3, 2024

(30) Foreign Application Priority Data

Mar. 29, 2023  (KR) .................. 10-2023-0041402

(51) Int. Cl.
*H04L 29/06* (2006.01)
*G06F 21/57* (2013.01)
*H04L 9/08* (2006.01)
*H04L 9/30* (2006.01)

(52) U.S. Cl.
CPC .......... *H04L 9/0852* (2013.01); *G06F 21/577* (2013.01); *H04L 9/30* (2013.01); *G06F 2221/034* (2013.01)

(58) Field of Classification Search
CPC ..... H04L 9/0852; H04L 9/30; H04L 63/1433; G06F 21/566; G06F 21/562; G06F 21/577; G06F 2221/034
See application file for complete search history.

(56) References Cited

U.S. PATENT DOCUMENTS

| 11,265,159 B1 | 3/2022 | Truskovsky et al. |
| 11,334,667 B1 | 5/2022 | Ramanathan et al. |
| 11,411,979 B2 | 8/2022 | Bulut et al. |
| 11,477,016 B1 | 10/2022 | Carter, Jr. et al. |

(Continued)

FOREIGN PATENT DOCUMENTS

KR   10-2018-0010053 A   1/2018

OTHER PUBLICATIONS

Communication issued on Mar. 26, 2024 by the European Patent Office for European Patent Application No. 23205081.5.

(Continued)

*Primary Examiner* — Tri M Tran
(74) *Attorney, Agent, or Firm* — Sughrue Mion, PLLC

(57) ABSTRACT

Provided are a method for analyzing quantum vulnerability and a system therefor. The method according to some embodiments may include configuring quantum-vulnerable algorithm detection rule based on a type of encryption algorithm, configuring an analysis level for analyzing a quantum vulnerability of target software, from among a plurality of predefined analysis levels, analyzing the target software based on the configured quantum-vulnerable algorithm detection rule, using an analysis technique corresponding to the configured analysis level, and assessing the quantum vulnerability of the target software based on a result of the analyzing.

17 Claims, 9 Drawing Sheets

(56) References Cited

U.S. PATENT DOCUMENTS 12,200,116 B1 * 1/2025 Rao .................. H04L 9/0852
2022/0108010 A1 4/2022 Bishop, III et al.

OTHER PUBLICATIONS

Joseph J. Kearneya et al., "Vulnerability of blockchain technologies to quantum attacks", arXiv:2105.01815v1, [quant-ph], May 5, 2021, 16 pages.

Raj Badhwar, "The CISO's Next Frontier: AI, Post-Quantum Cryptography and Advanced Security Paradigms", Springer, 2021, 398 pages, https://doi.org/10.1007/978-3-030-75354-2.

* cited by examiner

| CLASSIFICATION | SOURCE CODE | | | | LIBRARY | | | APPLICATION | | | | NETWORK | | | |
|---|---|---|---|---|---|---|---|---|---|---|---|---|---|---|---|
| | #1 | #2 | ⋮ | #$L_1$ | #1 | #2 | ⋮ | #$L_2$ | #1 | #2 | ⋮ | #$L_3$ | #1 | #2 | ⋮ | #$L_4$ |
| ITEM-SPECIFIC SCORES | $v_{1,1}$ | $v_{1,2}$ | ⋮ | $v_{1,L_1}$ | $v_{2,1}$ | $v_{2,2}$ | ⋮ | $v_{2,L_2}$ | $v_{3,1}$ | $v_{3,2}$ | ⋮ | $v_{3,L_3}$ | $v_{4,1}$ | $v_{4,2}$ | ⋮ | $v_{4,L_4}$ |
| RELIABILITY WEIGHT | $\alpha_{1,1}$ | $\alpha_{1,2}$ | ⋮ | $\alpha_{1,L_1}$ | $\alpha_{2,1}$ | $\alpha_{2,2}$ | ⋮ | $\alpha_{2,L_2}$ | $\alpha_{3,1}$ | $\alpha_{3,2}$ | ⋮ | $\alpha_{3,L_3}$ | $\alpha_{4,1}$ | $\alpha_{4,2}$ | ⋮ | $\alpha_{4,L_4}$ |
| IMPORTANCE WEIGHT | $w_{1,1}$ | $w_{1,2}$ | ⋮ | $w_{1,L_1}$ | $w_{2,1}$ | $w_{2,2}$ | ⋮ | $w_{2,L_2}$ | $w_{3,1}$ | $w_{3,2}$ | ⋮ | $w_{3,L_3}$ | $w_{4,1}$ | $w_{4,2}$ | ⋮ | $w_{4,L_4}$ |
| QUANTUM VULNERABILITY SCORE | $Score = \sum_{i,j} v_{i,j} \cdot \alpha_{i,j} \cdot w_{i,j}$ | | | | | | | | | | | | | | | |

FIG. 9

METHOD FOR ANALYZING QUANTUM VULNERABILITY AND SYSTEM THEREFOR

CROSS-REFERENCE TO RELATED APPLICATION

This application claims priority from Korean Patent Application No. 10-2023-0041402 filed on Mar. 29, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a method for analyzing quantum vulnerability and system therefor.

2. Description of the Related Art

Many systems that handle sensitive data use public-key cryptographic systems to ensure system security (e.g., data security, communication security, etc.). However, with the rapid advancement of computing technology, the development of quantum computers is becoming visible faster than expected, and the threat of quantum computers to public-key cryptographic systems is becoming a reality. For example, the security of the Rivest-Shamir-Adleman (RSA) algorithm relies on the difficulty of the factorization problem, but quantum computers are known to be able to solve it quickly.

In order to prepare in advance for security threats in the era of quantum computers that lies ahead, it is essential to accurately assess the quantum vulnerability of cryptographic systems installed in various systems. However, there is still no proposed method for accurately assessing the quantum vulnerability of various systems through systematic analysis.

SUMMARY

Aspects of the present disclosure provide a method and system to systematically analyze the quantum vulnerability of a target system.

Aspects of the present disclosure also provide a method and system for quantitatively and accurately assessing the quantum vulnerability of a target system.

Aspects of the present disclosure also provide a quantum vulnerability analysis method and system that may be universally applied across various target systems.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a method for analyzing quantum vulnerability performed by at least one computing device. The method may include configuring quantum-vulnerable algorithm detection rule based on a type of encryption algorithm; configuring an analysis level for analyzing a quantum vulnerability of target software, from among a plurality of predefined analysis levels; analyzing the target software based on the configured quantum-vulnerable algorithm detection rule, using an analysis technique corresponding to the configured analysis level; and assessing the quantum vulnerability of the target software based on a result of the analyzing.

In some embodiments, the configured quantum-vulnerable algorithm detection rule may be defined further based on a key size of the encryption algorithms.

In some embodiments, the predefined analysis levels may include a source code level, a library level, an application level, and a network level.

In some embodiments, the configured analysis level corresponds to a source code level and a library level, and the analyzing the target software may include: performing static analysis on source code of the target software; and performing binary analysis on a library referenced in the target software.

In some embodiments, the configured analysis level corresponds to an application code level and a network level, and the analyzing the target software may include: performing dynamic analysis and network analysis on the target software.

In some embodiments, the configured analysis level corresponds to a source code level, and the analyzing the target software may include: extracting functions or classes used in source code of the target software through static analysis; and analyzing a quantum vulnerability of the source code by applying the configured quantum-vulnerable algorithm detection rule to the extracted functions or classes.

In some embodiments, the configured analysis level corresponds to an application level, and the analyzing the target software may include: measuring memory usage per function or class by analyzing an execution memory of the target software through dynamic analysis; determining functions or classes used in the target software during execution based on the measured memory usage per function or class; and analyzing the quantum vulnerability of the target software by applying the configured quantum-vulnerable algorithm detection rule to the determined functions or classes.

In some embodiments, the configured analysis level includes first level and second level, and the assessing the quantum vulnerability of the target software may include: calculating a first quantum vulnerability score based on an analysis result corresponding to the first level; calculating a second quantum vulnerability score based on an analysis result corresponding to the second level; and calculating the quantum vulnerability of the target software by aggregating the first and second quantum vulnerability scores based on weights.

In some embodiments, the first level is a source code level, the second level is an application level or a network level, and a weight applied to the second quantum vulnerability score may be determined to be greater than a weight applied to the first quantum vulnerability score.

In some embodiments, weights applied to the first quantum vulnerability score and second quantum vulnerability score may be determined based on reliabilities of analysis tools used in analyses at the first level and second level.

In some embodiments, the result of the analyzing comprises a result of analysis of a plurality of analysis items included in the configured analysis level, and the assessing the quantum vulnerability of the target software may include: calculating vulnerability scores for the analysis items; and calculating a quantum vulnerability score for the target software by aggregating the calculated vulnerability scores based on an item-specific weight.

In some embodiments, among the analysis items, a specific item relates to a type of a quantum-vulnerable algorithm used by the target software or whether the quantum-vulnerable algorithm is used by the target software, and a weight for the specific item may be determined based on a key size of the quantum-vulnerable algorithm.

In some embodiments, the result of the analysis of the analysis items includes timestamp when usage of a quantum-vulnerable algorithm is detected within the target software, and the item-specific weight may be determined based on a result of comparison of the timestamp.

In some embodiments, the method may further include: extracting information on hosts communicating with the target software through network analysis of the target software when the configured analysis level is a network level.

In some embodiments, the configured analysis level is other than a network level, and the method further include: extracting information on host communicating with the target software by performing network analysis on the target software when a quantum vulnerability score for the target score, obtained as a result of the assessment, is equal or greater than a threshold value; and providing the extracted information.

According to another embodiments of the present disclosure, there is provided a system for analyzing quantum vulnerability. The system may include: at least one processor; and a memory storing instructions, wherein by executing the at least one instruction stored in the memory, the at least one processor performs operations including: configuring quantum-vulnerable algorithm detection rule based on a type of encryption algorithm; configuring an analysis level for analyzing a quantum vulnerability of target software, from among a plurality of predefined analysis levels; analyzing the target software based on the configured quantum-vulnerable algorithm detection rule, using an analysis technique corresponding to the configured analysis level; and assessing the quantum vulnerability of the target software based on a result of the analysis.

According to yet another embodiments of the present disclosure, there is provided a computer program stored on a computer-readable recording medium for executing, by being coupled to a computing device, the steps including: configuring quantum-vulnerable algorithm detection rule based on a type of encryption algorithm; configuring an analysis level for analyzing a quantum vulnerability of target software, from among a plurality of predefined analysis levels; analyzing the target software based on the configured quantum-vulnerable algorithm detection rule, using an analysis technique corresponding to the configured analysis level; and assessing the quantum vulnerability of the target software based on a result of the analysis.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a table for explaining a method of calculating the quantum vulnerability of score for target software based on an analysis item weight and a reliability weight according to some embodiments of the present disclosure.

DETAILED DESCRIPTION

Figure 1:
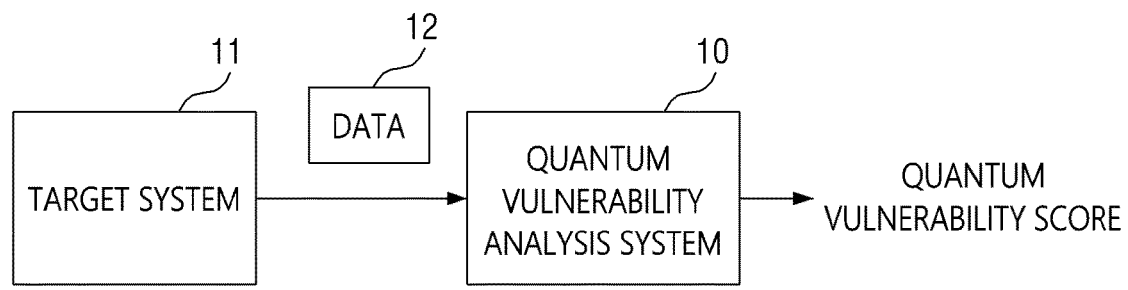
FIG. 1 is a block diagram of a quantum vulnerability analysis system according to some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will be described with reference to the attached drawings.

FIG. 1 is a block diagram of a quantum vulnerability analysis system according to some embodiments of the present disclosure.

Referring to FIG. 1, a quantum vulnerability analysis system 10 may refer to a computing device/system capable of analyzing and assessing the quantum vulnerability of a target system 11. Here, the term "quantum vulnerability" denotes a threat imposed by quantum computers or the extent to which existing encryption systems may be compromised (or decrypted) by quantum computers and may also be referred to as "quantum threat." For convenience, the quantum vulnerability analysis system 10 will hereinafter be abbreviated as the "analysis system 10."

Specifically, the analysis system 10 may analyze and assess the quantum vulnerability of the target system 11 by analyzing data 12 associated with the target system 11. For example, the analysis system 10 may quantitatively assess the quantum vulnerability of the target system 11 and provide the result of the assessment (as a quantum vulnerability score). By configuring an analysis environment (e.g., analysis levels, analysis tools, analysis items, etc.) according to the characteristics of the target system 11 (e.g., development lifecycle, functionalities, relevant fields, relevance to sensitive data, programming language, etc.), the analysis system 10 may accurately assess the quantum vulnerability of the target system 11, and this will be later in detail with reference to FIG. 2 and the subsequent figures.

The target system 11 may refer to an arbitrary target capable of being equipped with encryption capabilities, such as software such as applications (e.g., Java applications) or a devices/system equipped with such software. For convenience, assuming that the target system 11 is software, the target system 11 will hereinafter be described as being, for example, software, and may also be referred to as the target software 11 accordingly.

The data 12, which is subject to analysis, may encompass various data related to the target system 11 without limitations, including source code of applications/libraries, binary code (or files), executable files, and network traffic.

The analysis system 10 may be implemented using at least one computing device. For example, all functionalities of the analysis system 10 may be implemented within a single computing device. In another example, first and second functionalities of the analysis system 10 may be implemented within first and second computing systems, respectively. In yet another example, a specific function of the analysis system 10 may be implemented across multiple computing devices.

Here, the term "computing device" encompasses any device equipped with computing capabilities, and an example of such device will be described later with reference to FIG. 10. A computing device, which is an assembly where various components (e.g., memories, processors, and the like) interact, may also be referred to as a "computing system." Also, the term "computing system" may also encompass the concept of a group of multiple computing devices interacting with each other.

A general description of the analysis system 10 according to some embodiments of the present disclosure has been presented so far with reference to FIG. 1. The configuration and operation of the analysis system 10 will hereinafter be described with reference to FIGS. 2 and 3.

Figure 2:
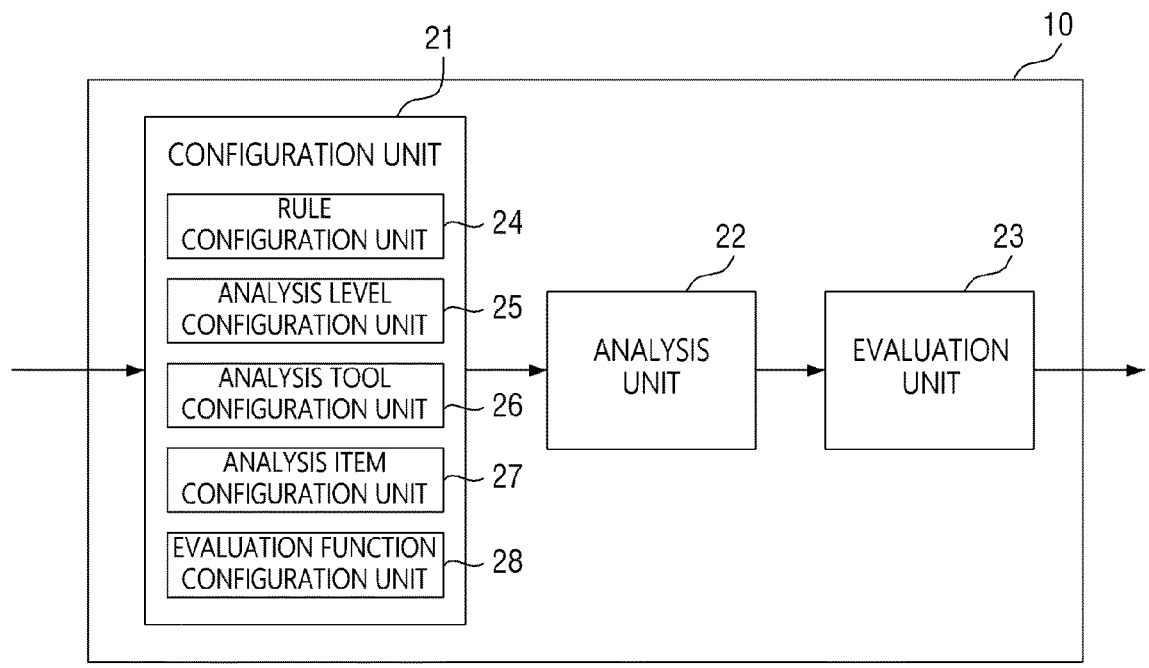
FIG. 2 is a detailed block diagram of the quantum vulnerability analysis system according to some embodiments of the present disclosure.

FIG. 2 is a block diagram of the analysis system 10.

Referring to FIG. 2, the analysis system 10 may include a configuration unit 21, an analysis unit 22, and an evaluation unit 23. FIG. 2 only illustrates components relevant to embodiments of the present disclosure, and it is obvious that the analysis system 10 may further include other general components (e.g., a processor, a memory, an input/output interface, and the like) other than those illustrated in FIG. 2. Additionally, the components of the analysis system 10 represent components that are functionally distinct. In an actual physical environment, a plurality of functional components may be integrated into fewer functional components, or a specific functional component may be divided into multiple sub-functional components. The components of the analysis system 10 will hereinafter be described.

The configuration unit 21 may perform (or provide) the functionality for configuring (or setting) an environment for quantum vulnerability analysis of target software. For example, the configuration unit 21 may perform (or provide) a configuration function for quantum-vulnerable algorithm detection rules, analysis levels, analysis tools, analysis items, and evaluation functions. The configuration unit 21 may also perform (or provide) the functionality for configuring the target software. To avoid excessive repetition of terms and enhance clarity within the present disclosure, the term "analysis" may be omitted when referring to analysis levels, analysis tools, and analysis items. The configuration unit 21 may be referred to as 'setting unit', 'configuration manager', 'configuration module', 'configurator', etc. The names of other units (e.g., 22 to 28) may also be changed and referred to in a similar manner.

The configuration unit 21 may include a rule configuration unit 24, an analysis level configuration unit 25, an analysis tool configuration unit 26, an analysis item configuration unit 27, and an evaluation function configuration unit 28. Although not explicitly illustrated in FIG. 2, the configuration unit 21 may also include a target configuration unit for configuring the target software.

The rule configuration unit 24 may define and configure (or set) rules (hereinafter referred to simply as "detection rules") for detecting quantum-vulnerable (or quantum-resistant) algorithms. The detection rules may be used by the analysis unit 22 to analyze the quantum vulnerability of the target software.

The detection rules may be defined based on various factors, such as the types, key sizes, and usage modes of encryption algorithms, but the present disclosure is not limited thereto. The detection rules may also be defined based on other information associated with encryption algorithms.

For example, the detection rules may be defined based on the types of encryption algorithms to identify encryption algorithms that rely on the difficulty of the factorization problem (or the discrete algebraic problem) and classify the identified encryption algorithms as quantum-vulnerable algorithms. Examples of the quantum-vulnerable algorithms include the Diffie-Hellman algorithm, the Digital Signature algorithm (DSA), and the Rivest-Shamir-Adleman (RSA) algorithm.

In another example, the detection rules may be defined not only based on the types but also the key sizes of encryption algorithms to identify the quantum-vulnerable algorithms. In this example, even for the same encryption algorithms, the outcome of the identification (or classification) may vary depending on their key size, and this leads to a more precise evaluation of the quantum vulnerability of the target software. For instance, situations where high quantum vulnerability scores are assigned to encryption algorithms with significantly large key sizes may be avoided.

Figure 3:
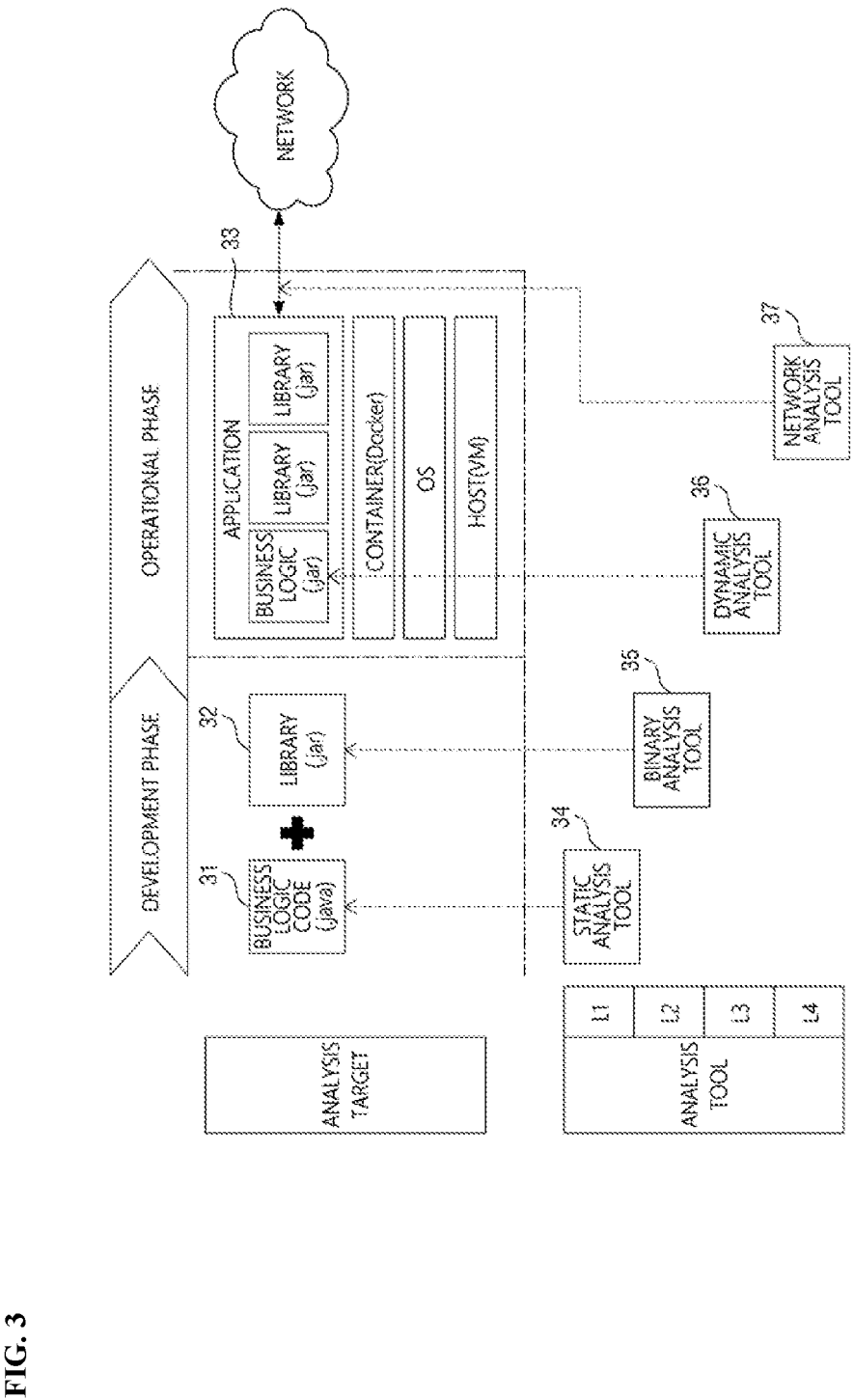
FIG. 3 is a schematic view illustrating the exemplary usage of the quantum vulnerability analysis system according to some embodiments of the present disclosure.

Thereafter, the analysis level configuration unit 25 may define and configure (or set) an analysis level for analyzing the quantum vulnerability of the target software. As illustrated in FIG. 3, the analysis level may be categorized into, for example, a source code level, a library (or binary) level, an application (or process/execution) level, or a network level, but the present disclosure is not limited thereto. That is, the analysis level may be further subdivided depending on factors such as the applied analysis tool. For instance, when different analysis tools are applied to various network protocols such as Transport Layer Security (TLS), Secure Shell (SSH), and Quick UDP Internet Connections (QUIC), the network level may be further subdivided into three sub-levels.

As depicted in FIG. 3, an analysis target, which ranges from business logic code 31 to a library 32 to an application 33, and an analysis tool, which ranges from a static analysis tool 34 to a binary analysis tool 35 to a dynamic analysis tool 36 to a network analysis tool 37, may be determined based on the analysis level. As a result, the quantum vulnerability of the target software may be systematically analyzed at different analysis levels.

Thereafter, the analysis tool configuration unit 26 may configure a tool to be used in the analysis of the quantum vulnerability of the target software. For example, the analysis tool configuration unit 26 may configure an analysis tool based on the analysis level and/or analysis item.

As illustrated in FIG. 3, an analysis technique and an analysis tool for the target software may vary depending on the analysis level configured for the target software, enabling a systematic analysis of the quantum vulnerability of the target software at different analysis levels.

Thereafter, the analysis item configuration unit 27 may define and configure (or set) at least one analysis item for analyzing the quantum vulnerability of the target software. Analysis items may be defined and configured on a level-by-level basis, but the present disclosure is not limited thereto. Exemplary analysis items may become apparent from Tables 1 and 2 below.

TABLE 1

| Level | Source Code (L1) | Library (L2) |
|---|---|---|
| Associated Items | Quantum vulnerability of function-related encryption algorithms<br>Key size of function-related encryption algorithms | Inclusion of reference libraries<br>Quantum vulnerability of function-related encryption algorithms<br>Key size of function-related encryption algorithms |

TABLE 2

| Level | Application (L3) | Network (L4) |
|---|---|---|
| Associated Items | Memory usage by class<br>Quantum vulnerability of function-related encryption algorithms<br>Key size of function-related encryption algorithms | IP addresses<br>List of key exchange-related algorithms<br>Quantum vulnerability of key exchange-related algorithms<br>Key size of key exchange-related algorithms<br>Quantum vulnerability of certificate signature-related algorithms |

Thereafter, the evaluation function configuration unit 28 may define and configure (or set) functions used to quantitatively evaluate the quantum vulnerability of the target software. For example, the evaluation function configuration unit 28 may configure evaluation functions for each analysis level and/or analysis item. Through the evaluation functions, the quantum vulnerability of the target software may be objectively and quantitatively measured. The evaluation functions may also be referred to as "scoring functions." It is assumed that the higher the quantum vulnerability score, the more vulnerable the target software is to quantum computer threats.

As shown in Table 3 below, the evaluation functions may be defined to quantitatively measure aspects such as the quantum vulnerability and security of encryption algorithms (e.g., encryption algorithms related to functions/classes used in the target software). Examples of the evaluation functions may become apparent from Tables 3 and 4 below.

TABLE 3

| Level | Source Code (L1) |
|---|---|
| Evaluation Functions | 1) f:{Function name} -> {'Quantum-vulnerable'=1, 'Quantum-resistant'=0}<br>2) f:{ Function Name } -> {'NIST Quantum security level1'=5, 'level2'=4, ... } |
| Application Examples | 1) f('RSAKeyGenParameterSpec')=0, f('DHParameterSpec')= 0<br>2) f('Kyber512.*')=3, f('Kyber768.*')=1 |

TABLE 4

| Level | Network (L4) |
|---|---|
| Evaluation Functions | f:{IP Address} -> {'not included in vulnerable IP address DB'=0, 'Included in vulnerable IP address DB'=1} |
| Application Examples | f('192.168.123.0')=0, f('192.168.123.255')=1 |

Meanwhile, the configuration unit 21 may automatically configure (or set) the analysis environment in consideration of the characteristics of the target software or based on input from a user (e.g., an administrator).

For example, when the target software requires a high level of security (e.g., when the target software processes sensitive data or is in the operational phase), the configuration unit 21 may automatically configure a greater number of analysis levels and/or items or utilize analysis tools with higher reliability.

In another example, as illustrated in FIG. 3, the configuration unit 21 may automatically configure the analysis level and tool for the target software in consideration of the stage at which the target software is in its development lifecycle (e.g., development phase, operational phase, etc.).

In another example, the configuration unit 21 may automatically configure the analysis environment for the target software by referencing the analysis environment for software with similar characteristics to the target software, from among previously analyzed software.

In another example, the configuration unit 21 may configure the analysis environment for the target software based on various combinations of the aforementioned examples.

Figure 5:
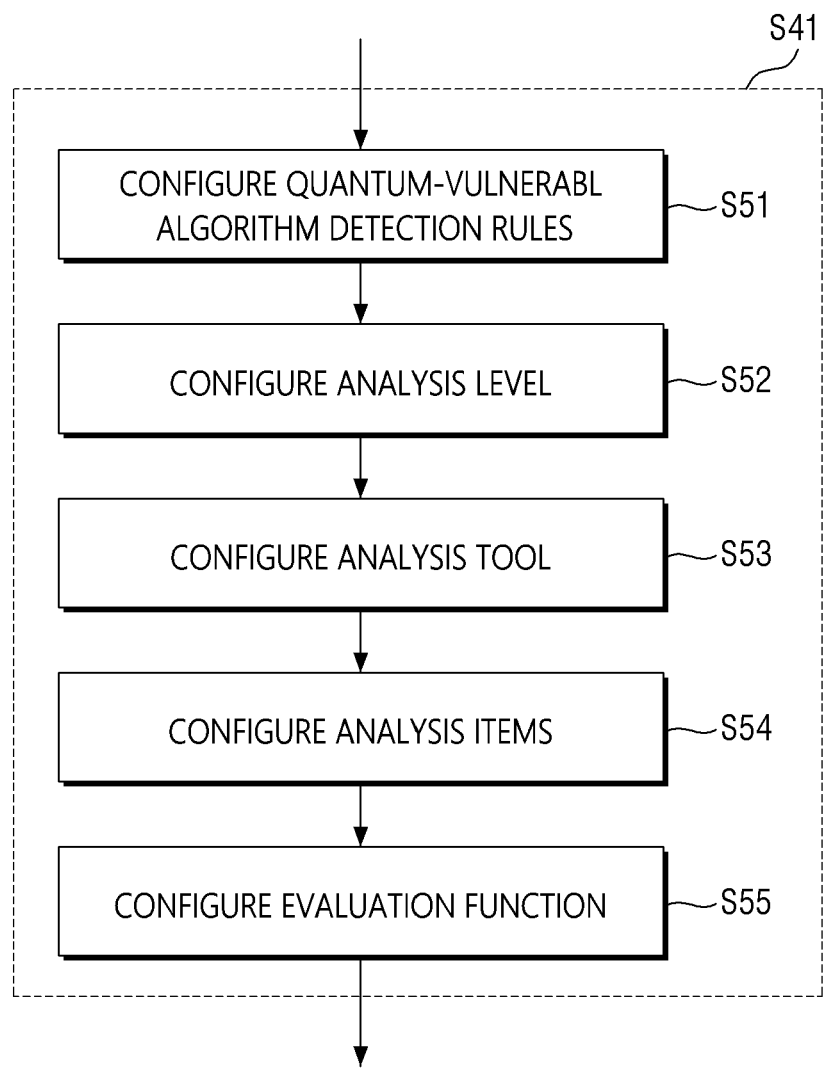
FIG. 5 is a flowchart illustrating S41 of FIG. 4.

Additional information on the configuration unit 21 may be found in the explanation provided in FIG. 5.

Thereafter, the analysis unit 22 may analyze the quantum vulnerability of the target software based on the analysis environment configured by the configuration unit 21. Specifically, the analysis unit 22 may analyze the target software using an analysis technique (or tool) corresponding to the analysis level configured for the target software.

For example, as illustrated in FIG. 3, if the configured analysis level is the source code level L1, the analysis unit 22 may analyze the configured analysis items, e.g., source code 31 of the target software, using a static analysis tool 34.

In another example, if the configured analysis level is the library level L2, the analysis unit 22 may analyze a library 32 referenced by the target software using the binary analysis tool 35.

In another example, if the configured analysis level is the application level L3, the analysis unit 22 may analyze the execution state of a target application 33 using a dynamic analysis tool 36.

In another example, if the configured analysis level is the network level L4, the analysis unit 22 may analyze the network protocol and network traffic of the target application 33 using a network analysis tool 37.

In another example, the analysis unit 22 may analyze the target application 33 based on various combinations of the aforementioned examples. For instance, if the configured analysis level corresponds to both the source code level L1 and the library level L2, the analysis unit 22 may perform separate analyses for the source code level L1 and the library level L2 for the target software.

Figure 6:
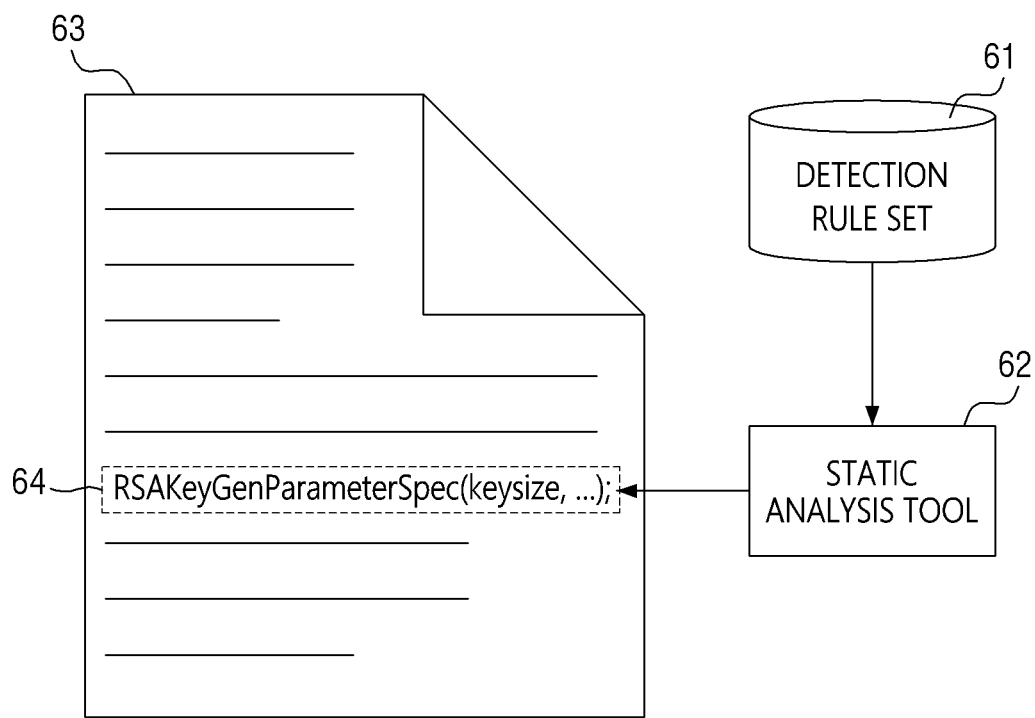
FIG. 6 is a schematic view illustrating a source code-level quantum vulnerability analysis method according to some embodiments of the present disclosure.
Figure 7:
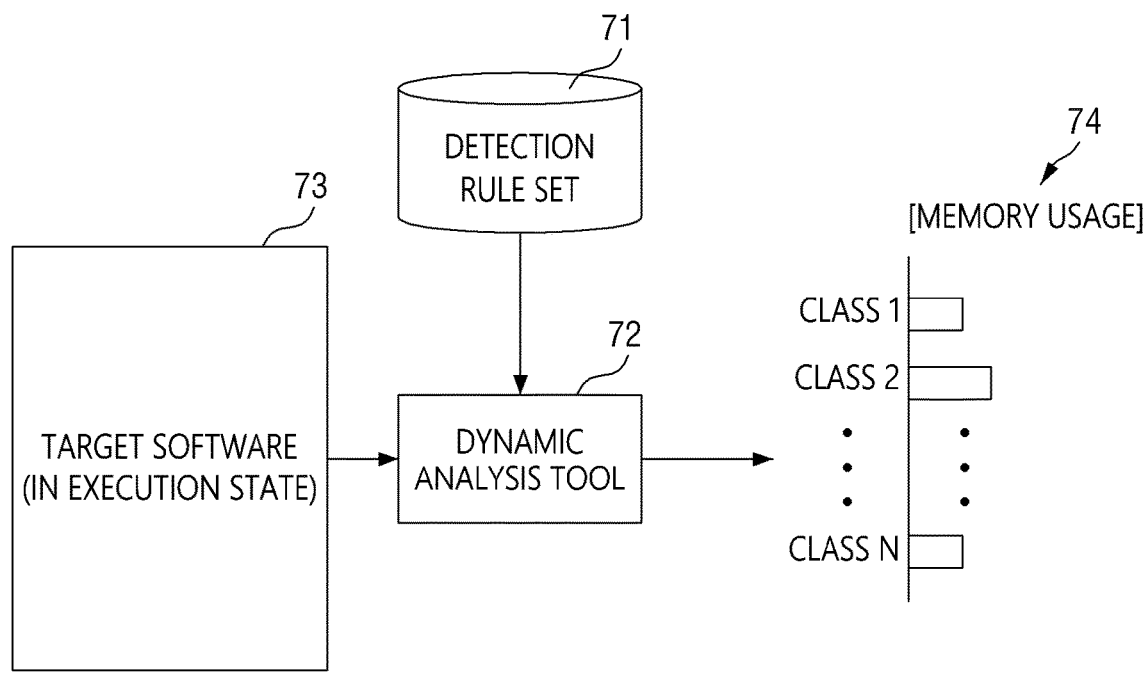
FIG. 7 is a schematic view illustrating an application code-level quantum vulnerability analysis method according to some embodiments of the present disclosure.

The analysis unit (22) may analyze the quantum vulnerability of the target software based on the pre-configured detection rules. For a more detailed explanation, please refer to FIGS. 6 and 7 and other related diagrams.

Figure 4:
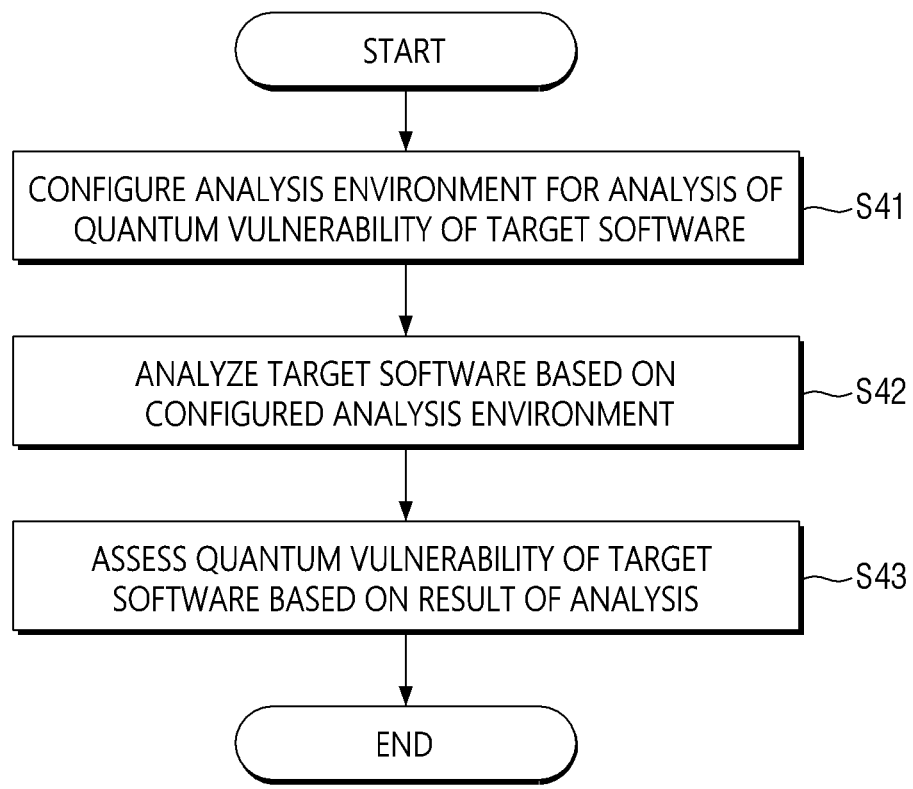
FIG. 4 is a flowchart illustrating a quantum vulnerability analysis method according to some embodiments of the present disclosure.

Additional information on the analysis unit 22 may be found in the explanation provided in FIG. 4 and the subsequent figures.

Thereafter, the evaluation unit 23 may assess the quantum vulnerability of the target software based on the analysis result from the analysis unit 22. The evaluation unit 23 may calculate a quantum vulnerability score for the target software using a pre-configured evaluation function. This will be described later in detail with reference to FIG. 4 and the subsequent figures.

The components of the analysis system 10 of FIG. 2 may refer to software or hardware such as field programmable gate arrays (FPGAs) or application-specific integrated circuits (ASICs), but the present disclosure is not limited thereto. The components of the analysis system 10 may be configured within an addressable storage medium or designed to execute one or more processors. The functionalities provided within the components of the analysis system 10 may be implemented by further sub-divided components and may also be implemented by fewer components performing specific functionalities. Additionally, the components of the analysis system 10 may be implemented as independent computing devices.

FIG. 3 is a diagram illustrating an example in which the analysis system 10 analyzes the quantum vulnerability of the target software in consideration of its development lifecycle when the target software is a Java application.

Referring to FIG. 3, if the target software is in the development phase, the analysis system 10 may analyze the quantum vulnerability of the source code 31 and the library 32 using the static analysis tool 34 and the binary analysis tool 35.

Conversely, if the target software is in the operational phase, the analysis system 10 may analyze the quantum vulnerability of the target software 33 using the dynamic analysis tool 36 and the network analysis tool 37.

By providing analysis capabilities for various analysis levels, a quantum vulnerability analysis functionality tailored to the characteristics of the target software may be offered, and a quantum vulnerability analysis functionality may also be provided for software in the development phase.

So far, the configuration and operation of the analysis system 10 have been described with reference to FIGS. 2 and 3. Detailed explanations of various methods that may be performed in the analysis system 10 will hereinafter be presented with reference to FIG. 4 and the subsequent figures.

For clarity, it is assumed that all steps/operations of the methods that will hereinafter be described are performed in the analysis system 10. Therefore, even if the subject of a specific step/operation is not mentioned, it may be understood that the specific step/operation is performed within the analysis system 10.

FIG. 4 is a flowchart illustrating a quantum vulnerability analysis method according to some embodiments of the present disclosure. However, the embodiment of FIG. 4 is merely exemplary, and it is understood that some steps may be added or removed as needed to or from the embodiment of FIG. 4.

Referring to FIG. 4, the quantum vulnerability analysis method according to some embodiments of the present disclosure may begin with S41, which involves configuring an environment for analyzing the quantum vulnerability of the target software. Sub-steps of S41 are as illustrated in FIG. 5.

Referring to FIG. 5, the analysis system 10 may configure an analysis environment for analyzing the quantum vulnerability of the target software by defining and configuring detection rules, an analysis level, an analysis tool, analysis items, and an evaluation function for the target software (S51 through S55). Due to this flexible configuration capability, the quantum vulnerability analysis method according to some embodiments of the present disclosure may be widely applied to various systems.

The method to configure the analysis environment is not particularly limited. For example, the analysis system 10 may configure the detection rules, analysis level, analysis tool, and evaluation function for the target software automatically or based on user input.

In S42, the target software may be analyzed based on the configured analysis environment. For example, the analysis system 10 may analyze the target software using an analysis technique corresponding to the configured analysis level. The analysis system 10 may analyze the target software for each of the configured analysis items and perform analysis using the configured detection rules (e.g., identify quantum-vulnerable algorithms used in the target software). Also, the analysis system 10 may store the result of the analysis of the target software in a storage medium. In this case, the result of the analysis of the target software may include timestamp information indicating the time of detection of each quantum-vulnerable algorithm from the target software.

For example, it is assumed that the configured analysis level is the source code level. In this case, referring to FIG. 6, the analysis system 10 may analyze source code 63 of the target software using a static analysis tool 62 (i.e., applying a static analysis technique). Specifically, the analysis system 10 may extract functions 64 or classes used (or called) in the source code 63 (e.g., extract function names) through the static analysis tool 62 and apply detection rules 61 to the extracted functions 64 or classes to determine (or identify) whether quantum-vulnerable algorithms are used in the source code 63 (i.e., whether functions related to quantum-vulnerable algorithms are called). Through this process, the quantum vulnerability of the source code 63 (i.e., the quantum vulnerability at the source code level) may be accurately analyzed, and the analysis result for each analysis item may be obtained.

The static analysis tool 62 may extract information regarding the functions or classes associated with the quantum-vulnerable algorithms used in the source code 63 by analyzing the source code 63 with reference to the detection rules 61. Then, the analysis system 10 may derive the analysis result for each analysis item (e.g., for whether quantum-vulnerable algorithms are used, etc.) based on the extracted information.

In another example, it is assumed that the configured analysis level is the library level. In this case, the analysis system 10 may analyze the library referenced by the target software using a binary analysis tool (i.e., applying a binary analysis technique). If the referenced library exists in the form of source code, the analysis system 10 may also analyze the source code of the referenced library using a static analysis tool.

In another example, it is assumed that the configured analysis level is the application level. In this case, referring to FIG. 7, the analysis system 10 may analyze the execution state of target software 73 (e.g., process) using a dynamic analysis tool 73 (i.e., applying a dynamic analysis technique). Specifically, the analysis system 10 may analyze the execution memory of the target software 73 through the dynamic analysis tool 73 and measure memory usage per function or class. Thereafter, the analysis system 10 may determine the functions or classes used in the target software 73 during execution based on the memory usage per function or class. Thereafter, the analysis system 10 may apply detection rules 71 to these functions or classes to analyze the quantum vulnerability of the target software 73 (i.e., the quantum vulnerability at the application level) and obtain the analysis result for each analysis item. Since application-level analysis may determine (or identify) whether quantum-vulnerable algorithm-related functions (or classes) in the source code of the target software 73 are actually used (or called), application-level analysis may have more significant implications than source code-level analysis. This analysis process may enhance the accuracy and reliability of quantum vulnerability analysis.

The analysis system 10 may monitor and analyze the internal operations of the target software 73 (e.g., calling functions, generating classes, etc.) through a dynamic analysis tool 72 and apply the detection rules 71 to determine whether quantum-vulnerable algorithm-related functions (or classes) are actually used (or called) in the target software 73.

Alternatively, the dynamic analysis tool 72 may extract information regarding the quantum-vulnerable algorithms and related functions (or classes) used in the target software 73 during execution by analyzing the target software 73 with reference to the detection rules 71. Then, the analysis system 10 may derive the analysis result for each analysis item based on the extracted information.

In another example, it is assumed that that the configured analysis level is the network level. In this example, the analysis system 10 may use a network analysis tool to analyze traffic and network protocol associated with the network operation of the target software. Through this analysis process, information regarding network hosts communicating with the target software may also be extracted.

In another example, the analysis system 10 may perform quantum vulnerability analysis based on various combinations of the aforementioned examples.

Referring back to FIG. 4, in S43, the quantum vulnerability of the target software may be evaluated based on the analysis result obtained in S42. For example, the analysis system 10 may calculate a quantum vulnerability score for the target software based on the analysis result obtained in S42, using a pre-configured evaluation function. Specifically, the analysis system 10 may calculate quantum vulnerability scores for the target software for different analysis levels and/or analysis items and may then aggregate the calculated quantum vulnerability scores based on weights to determine the total quantum vulnerability score for the target software. For example, if the configured analysis level is both the source code level L1 and the library level L2, the analysis system 10 may calculate the total quantum vulnerability score for the target software by combining, with an appropriate weight, a first quantum vulnerability score calculated from the analysis result for the source code level L1 and a second quantum vulnerability score calculated from the analysis result for the library level L2.

S41, S42, and S43 may be conducted by the configuration unit 21, the analysis unit 22, and the evaluation unit 23, respectively, of FIG. 2.

Meanwhile, to ensure precise calculation of the quantum vulnerability score for the target software, various types of weights may be used. For example, the analysis system 10 may utilize an analysis item weight, an analysis level weight, and a reliability weight to accurately calculate the quantum vulnerability score for the target software, and this will hereinafter be described.

The analysis item weight and the analysis level weight represent the significance of analysis items and analysis levels, respectively, and may also be referred to as an "item-specific importance weight" and a "level-specific importance weight," respectively. Additionally, the reliability weight denotes the reliability of analysis data and may also be referred to as an "item-specific reliability weight" (if assigned for each analysis item) or as a "level-specific reliability weight" (if assigned for each analysis level).

Figure 8:
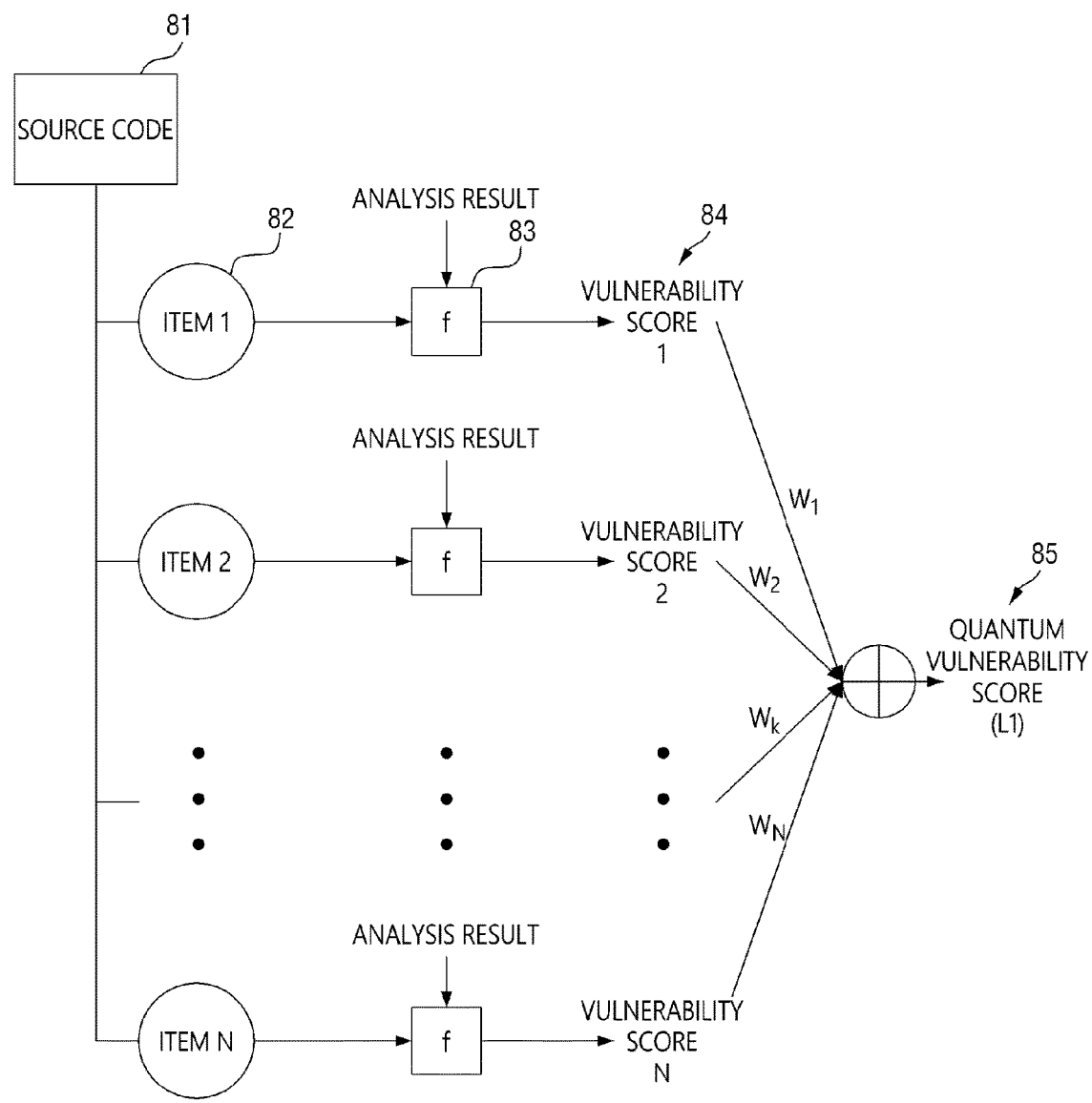
FIG. 8 is a schematic view illustrating a method of calculating a source code-level quantum vulnerability score based on item weights according to some embodiments of the present disclosure.

FIG. 8 illustrates the calculation of a quantum vulnerability score 85 at the source code level L1 based on an analysis item weight w1.

Referring to FIG. 8, the analysis system 10 may calculate item-specific quantum vulnerability scores 84 for analysis items 82 by applying an evaluation function 83 corresponding to the result of an item-specific analysis of source code 81 of the target software. Thereafter, the analysis system 10 may aggregate (e.g., sum up) the item-specific quantum vulnerability scores 84 based on the analysis item weight w1 to derive a quantum vulnerability score 85 for the source code level L1. The item-specific quantum vulnerability score mean quantum vulnerability score for each item and may be abbreviated as 'vulnerability score' to distinguish it from the final quantum vulnerability score of the target software.

Similarly, the analysis system 10 may calculate quantum vulnerability scores for other analysis levels. Moreover, the analysis system 10 may aggregate such level-specific quantum vulnerability scores to calculate the total quantum vulnerability score for the target software. If an analysis level weight is defined, the analysis system 10 may calculate the total quantum vulnerability score for the target software based on the analysis level weight.

Furthermore, if a reliability weight is defined, the analysis system 10 may calculate the total quantum vulnerability score for the target software based more on the reliability weight. For example, referring to FIG. 9, if reliability weight values and importance weight values are specified on an item-by-item basis, the analysis system 10 may aggregate (e.g., sum up) item-specific vulnerability scores based on both the reliability weight values and the importance weight values to calculate the total quantum vulnerability score for the target software.

Meanwhile, the method to determine the values of the aforementioned weights may vary.

For example, the importance weight (i.e., a weight assigned to each quantum vulnerability score) may be set to a greater value for a higher analysis level than for a lower analysis level, among the source code level L1, the library level L2, the application level L3, and the network level L4 of FIG. 3. The importance weight may be determined to have a greater value for the application level L3 or the network level L4 than for the source code level L1. This may be understood as reflecting that quantum vulnerability scores at the application level L3 and the network level L4 better represent the actual quantum vulnerability of the target software (e.g., a quantum vulnerability score at the source code level L1 also reflects the vulnerabilities of quantum-vulnerable algorithm functions that are not actually used).

In another example, the value of the reliability weight may be determined based on the reliability of the analysis tool used for the analysis of each analysis item or level. Specifically, the value of the reliability weight for the source code level L1 may be determined based on the reliability of a static analysis tool, while the value of the reliability weight for the application level L2 may be determined based on the reliability of a dynamic analysis tool. In this case, the greater the number of items (or vulnerabilities) detected from the target software by an analysis tool is, the higher the reliability of the analysis tool becomes, but the present disclosure is not limited thereto.

In another example, when a specific analysis item is associated with the use or the type of quantum-vulnerable algorithms within the target software, a weight for the specific analysis item may be determined based on the key size of the quantum-vulnerable algorithms used in the target software. For instance, as the smaller the key size of the quantum-vulnerable algorithms used in the target software is, the riskier the specific analysis item becomes, the weight for the specific analysis item may be set to a greater value for a smaller key size of the quantum-vulnerable algorithms used in the target software.

In another example, an item-specific weight may be determined based on the timestamp of each analysis item (i.e., the timestamp when the use of quantum-vulnerable algorithms is detected). For instance, the analysis system 10 may assign a greater item-specific weight value to analysis items with a smaller timestamp value (i.e., analysis items detected earlier), in consideration that the negative impact of quantum-vulnerable algorithms used at an early stage of the execution on the security of the target software is expected to be greater than that of quantum-vulnerable algorithms used at a later stage of the execution.

While not explicitly illustrated in FIG. 4, in some embodiments, an additional step of providing quantum vulnerability-related information on the target software may be further performed.

For example, the analysis system 10 may provide information on analysis items with vulnerability scores (calculated through an evaluation function) below a predetermined threshold value.

In another example, the analysis system 10 may provide host information on hosts communicating with the target software. As previously mentioned, the host information may be extracted through network analysis of the target software. The analysis system 10 may provide the host information based on the determination that the quantum vulnerability score (particularly, the network-level quantum vulnerability score) for the target software is above a predetermined threshold value. Alternatively, the analysis system 10 may extract the host information by performing network analysis on the target software based on the determination that the quantum vulnerability score for the target software that does not reflect the network-level analysis of the target software is above a predetermined threshold value.

In another example, the analysis system 10 may provide guidance information to improve the quantum vulnerability of the target software. The guidance information may include, for example, priorities for transitioning to quantum-resistant algorithms, transition timings, recommended quantum-resistant algorithms, and vulnerability improvement measures, but the present disclosure is not limited thereto. Specifically, the analysis system 10 may determine and provide module-specific transition priorities based on vulnerability scores calculated for each module (e.g., each function or class). In this case, the analysis system 10 may determine the importance of each module based on module dependency and usage frequency (e.g., higher importance for a module with a higher dependency and usage frequency) and may further determine the transition priorities based on module importance (e.g., a higher transition priority for a higher importance). Alternatively, the analysis system 10 may determine and provide improvement priorities for analysis items based on an item-specific weight and item-specific vulnerability scores calculated for the respective analysis items. For example, the analysis system 10 may assign higher improvement priorities to analysis items that may significantly reduce the quantum vulnerability score for the target software, when considering the item-specific vulnerability scores and weight.

In another example, the analysis system 10 may provide the quantum vulnerability-related information based on various combinations of the aforementioned examples.

Meanwhile, the analysis system 10 may additionally perform quantum vulnerability analysis at one or more higher analysis levels based on the determination that the quantum vulnerability score at a lower level is above a predetermined threshold value. For example, if the quantum vulnerability score at the source code level L1 is above the predetermined threshold value, the analysis system 10 may perform additional quantum vulnerability analysis at at least one of the library level L2, the application level L3, and the network level L4. The number of higher analysis levels where additional analysis is performed may also be determined based on the quantum vulnerability scores at the lower analysis level. In other words, the higher the quantum vulnerability score at the lower analysis level, the greater the number of higher analysis levels where additional analysis is performed.

Alternatively, in some embodiments, the analysis system 10 may perform additional quantum vulnerability analysis at one or more lower levels based on the determination that the quantum vulnerability score at a higher level is above a predetermined threshold value. For example, if the quantum vulnerability score at the network level L4 is above the predetermined threshold value, the analysis system 10 may perform additional quantum vulnerability analysis at least at one of the source code level L1, the library level L2, and the application level L2. The number of lower analysis levels where additional analysis is performed may also be determined based on the quantum vulnerability scores at the higher analysis level. In other words, the higher the quantum vulnerability score at the higher analysis level, the greater the number of lower analysis levels where additional analysis is performed.

So far, the quantum vulnerability analysis method according to some embodiments of the present disclosure has been described with reference to FIGS. 4 through 9. As mentioned earlier, by systematically analyzing the target software at various levels, the quantum vulnerability of the target system 11 may be accurately assessed.

Furthermore, through level- and item-specific evaluation functions, the quantum vulnerability of the target system 11 may be quantitatively determined as, for example, quantum vulnerability scores. As a result, it becomes possible to assess the quantum vulnerability of the target system 11 in an objective and quantitative manner, thereby furnishing valuable information to prepare for potential security threats posed by quantum computers. Such information may aid in decision-making regarding whether, when, and with what priorities to transition to a quantum-resistant encryption system.

Moreover, by utilizing various weights such as an analysis item weight and a reliability weight, the quantum vulnerability score for the target software may be accurately determined.

An exemplary computing device 100 that may implement the analysis system 10 will hereinafter be described.

Figure 10:
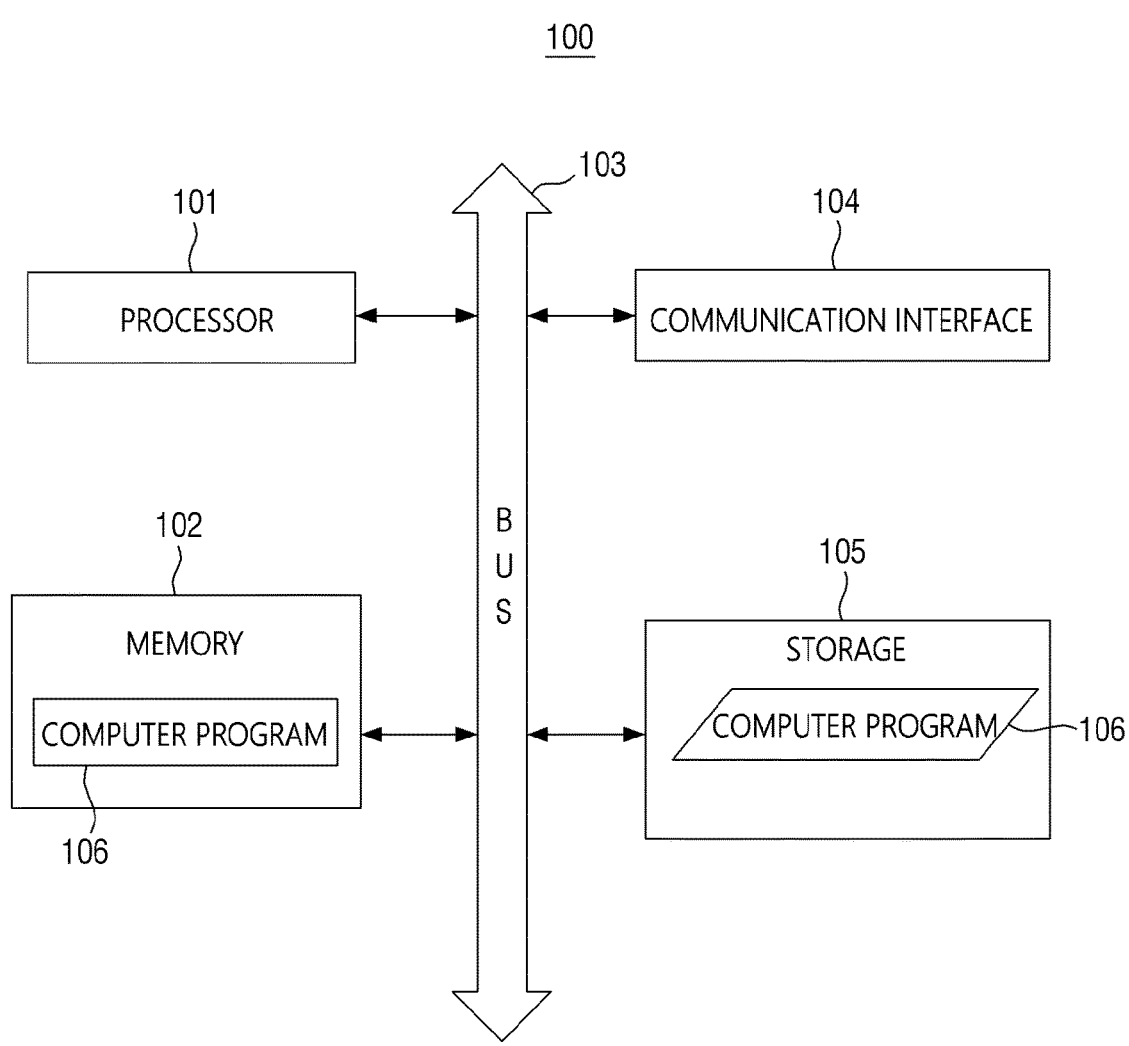
FIG. 10 is a block diagram of an exemplary computing device that may implement the quantum vulnerability analysis system according to some embodiments of the present disclosure.

FIG. 10 is a hardware configuration view of an exemplary computing device 100.

Referring to FIG. 10, the computing device 100 may include at least one processor 101, a bus 103, a communication interface 104, a memory 102, which loads a computer program 106 executed by the processor 101, and a storage 105, which stores the computer program 106. FIG. 10 only illustrates components relevant to the embodiments of the present disclosure, and it is obvious that the computing device 100 may further include other general components other than those illustrated in FIG. 10. In other words, the computing device 100 may be configured to include various components other than those illustrated in FIG. 10 or may be configured without some of the components illustrated in FIG. 10. The components of the computing device 100 will hereinafter be described.

The processor 101 may control the overall operations of the components of the computing device 100. The processor 101 may be configured to include at least one of a central processing unit (CPU), a micro-processor unit (MPU), a micro controller unit (MCU), a graphic processing unit (GPU), a neural processing unit (NPU), and any other known form of processor in the field to which the present disclosure pertains. The processor 101 may perform computations for at least one application or program for executing operations/methods according to some embodiments of the present disclosure. The computing device 100 may be equipped with one or more processors.

The memory 102 may store various data, commands, and/or information. The memory 102 may load the computer program 106 from the storage 105 to execute the operations/methods according to some embodiments of the present disclosure. The memory 102 may be implemented as a volatile memory such as a random-access memory (RAM), but the present disclosure is not limited thereto.

The bus 103 may provide communication functionality among the components of the computing device 100. The bus 103 may be implemented in various forms, including an address bus, a data bus, and a control bus.

The communication interface 104 may support both wired and wireless Internet communication for the computing device 100. Additionally, the communication interface 104 may also support various other communication methods. For this purpose, the communication interface 104 may be configured to include a communication module that is well known in the field to which the present disclosure pertains.

The storage 105 may temporarily store at least one computer program 106. The storage 105 may be configured to include a non-volatile memory (such as a read-only memory (ROM), an erasable programmable ROM (EPROM), an electrically erasable programmable ROM (EEPROM), or a flash memory), a hard disk, a removable disk, or any other well-known computer-readable medium in the field to which the present disclosure.

The computer program 106 may include one or more instructions that, upon being loaded into the memory 102, direct the processor 101 to perform the operations/methods according to some embodiments of the present disclosure. In other words, by executing the loaded instructions, the processor 101 may perform the operations/methods according to some embodiments of the present disclosure.

For example, the computer program 106 may include instructions to perform the following operations: configuring quantum-vulnerable algorithm detection rules based on types of encryption algorithms; configuring an analysis level for analyzing a quantum vulnerability of target software, from among a plurality of predefined analysis levels; analyzing the target software based on the configured quantum-vulnerable algorithm detection rules, using an analysis technique corresponding to the configured analysis level; and assessing the quantum vulnerability of the target software based on a result of the analysis. In this example, the analysis system 10 may be implemented by the computing device 100.

In some embodiments, the computing device 100 may refer to a virtual machine implemented based on cloud technology. For example, the computing device 100 may be a virtual machine operating on one or more physical servers within a server farm. In this example, at least some of the components of the computing device 100, i.e., the processor 101, the memory 102, and the storage 105, may be implemented as virtual hardware, and the communication interface 104 may be implemented as a virtual networking element such as a virtual switch.

An exemplary computing device 100 that may implement the analysis system 10 has been described so far with reference to FIG. 10.

Various embodiments of the present disclosure and their effects have been described with reference to FIGS. 1 through 10.

According to some embodiments of the present disclosure, the quantum vulnerability of a target system (e.g., software) may be accurately assessed by systematically analyzing the target system at various analysis levels.

Furthermore, through level-specific or item-specific evaluation functions, the quantum vulnerability of the target system may be quantitatively determined. As a result, an objective and quantitative assessment of the quantum vulnerability of the target system may be enabled, and valuable information for preparing against security threats from quantum computers, such as determining whether, when, and with what priorities to transition to quantum-resistant encryption systems, may be provided to the administrator of the target system.

Additionally, the accuracy of the quantum vulnerability score for the target system may be ensured by calculating the quantum vulnerability score for the target system based on factors such as an analysis item weight and a reliability weight.

Moreover, the analysis environment may be flexibly tailored to the characteristics of the target system by offering configuration capabilities for quantum-vulnerable algorithm detection rules, analysis levels, analysis tools, analysis items, and evaluation functions. That is, these configuration capabilities allow for the provision of a quantum vulnerability analysis method that may be universally applied in diverse systems.

However, the technical concepts of the present disclosure are not limited to the effects set forth herein, and other effects not explicitly mentioned may be readily understood by those skilled in the art to which the present disclosure, from the provided description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for analyzing quantum vulnerability performed by at least one computing device, the method comprising:
   configuring quantum-vulnerable algorithm detection rule based on a type of encryption algorithm;
   configuring an analysis level for analyzing a quantum vulnerability of target software, from among a plurality of predefined analysis levels;
   analyzing the target software based on the configured quantum-vulnerable algorithm detection rule, using an analysis technique corresponding to the configured analysis level; and
   assessing the quantum vulnerability of the target software based on a result of the analyzing,
   wherein the analyzing the target software comprises identifying whether functions related to a quantum-vulnerable algorithm are called in a source code of the target software using the configured quantum-vulnerable algorithm detection rule.

2. The method of claim 1, wherein the configured quantum-vulnerable algorithm detection rule is defined further based on a key size of the encryption algorithm.

3. The method of claim 1, wherein the plurality of predefined analysis levels comprise a source code level, a library level, an application level, and a network level.

4. The method of claim 1, wherein
   the configured analysis level corresponds to a source code level and a library level, and
   the analyzing the target software comprises:
   performing static analysis on source code of the target software; and
   performing binary analysis on a library referenced in the target software.

5. The method of claim 1, wherein
   the configured analysis level corresponds to an application code level and a network level, and
   the analyzing the target software comprises:
   performing dynamic analysis and network analysis on the target software.

6. The method of claim 1, wherein
   the configured analysis level corresponds to a source code level, and
   the analyzing the target software comprises:
   extracting functions or classes used in source code of the target software through static analysis; and
   analyzing a quantum vulnerability of the source code by applying the configured quantum-vulnerable algorithm detection rule to the extracted functions or classes.

7. The method of claim 1, wherein
   the configured analysis level corresponds to an application level, and
   the analyzing the target software comprises:
   measuring memory usage per function or class by analyzing an execution memory of the target software through dynamic analysis;
   determining functions or classes used in the target software during execution based on the measured memory usage per function or class; and
   analyzing the quantum vulnerability of the target software by applying the configured quantum-vulnerable algorithm detection rule to the determined functions or classes.

8. The method of claim 1, wherein
   the configured analysis level includes first level and second level, and
   the assessing the quantum vulnerability of the target software comprises:
   calculating a first quantum vulnerability score based on an analysis result corresponding to the first level;
   calculating a second quantum vulnerability score based on an analysis result corresponding to the second level; and
   calculating the quantum vulnerability of the target software by aggregating the first and second quantum vulnerability scores based on weights.

9. The method of claim 8, wherein
   the first level is a source code level,
   the second level is an application level or a network level, and
   a weight applied to the second quantum vulnerability score is determined to be greater than a weight applied to the first quantum vulnerability score.

10. The method of claim 8, wherein weights applied to the first quantum vulnerability score and second quantum vulnerability score are determined based on reliabilities of analysis tools used in analyses at the first level and the second level.

11. The method of claim 1, wherein
the result of the analyzing comprises a result of analysis of a plurality of analysis items included in the configured analysis level, and
the assessing the quantum vulnerability of the target software comprises:
calculating vulnerability scores for the analysis items; and
calculating a quantum vulnerability score for the target software by aggregating the calculated vulnerability scores based on an item-specific weight.

12. The method of claim 11, wherein
among the analysis items, a specific item relates to a type of a quantum-vulnerable algorithm used by the target software or whether the quantum-vulnerable algorithm is used by the target software, and
a weight for the specific item is determined based on a key size of the quantum-vulnerable algorithm.

13. The method of claim 11, wherein
the result of the analysis of the analysis items includes timestamp when usage of the quantum-vulnerable algorithm is detected within the target software, and
the item-specific weight is determined based on a result of comparison of the timestamp.

14. The method of claim 1, further comprising:
extracting information on hosts communicating with the target software through network analysis of the target software when the configured analysis level is a network level.

15. The method of claim 1, wherein
the configured analysis level is other than a network level, and
further comprising:
extracting information on host communicating with the target software by performing network analysis on the target software when a quantum vulnerability score for the target software, obtained as a result of the assessment, is equal or greater than a threshold value; and
providing the extracted information.

16. A system for analyzing quantum vulnerability comprising:
at least one physical processor; and
a memory configured to load a computer program executable by the at least one physical processor; and
wherein the computer program comprises instructions for performing:
configuring quantum-vulnerable algorithm detection rule based on a type of encryption algorithm;
configuring an analysis level for analyzing a quantum vulnerability of target software, from among a plurality of predefined analysis levels;
analyzing the target software based on the configured quantum-vulnerable algorithm detection rule, using an analysis technique corresponding to the configured analysis level; and
assessing the quantum vulnerability of the target software based on a result of the analysis,
wherein the analyzing the target software comprises identifying whether functions related to a quantum-vulnerable algorithm are called in a source code of the target software using the configured quantum-vulnerable algorithm detection rule.

17. A non-transitory computer-readable recording medium storing computer program, which, when executable by at least one processor, causes the at least one processor to execute the steps comprising:
configuring quantum-vulnerable algorithm detection rule based on a type of encryption algorithm;
configuring an analysis level for analyzing a quantum vulnerability of target software, from among a plurality of predefined analysis levels;
analyzing the target software based on the configured quantum-vulnerable algorithm detection rule, using an analysis technique corresponding to the configured analysis level; and
assessing the quantum vulnerability of the target software based on a result of the analysis,
wherein the analyzing the target software comprises identifying whether functions related to a quantum-vulnerable algorithm are called in a source code of the target software using the configured quantum-vulnerable algorithm detection rule.

* * * * *